Aug. 3, 1965
E. BARTHOLOMEW
3,198,187
INDUCTION SYSTEMS
Filed Oct. 8, 1963
3 Sheets-Sheet 1
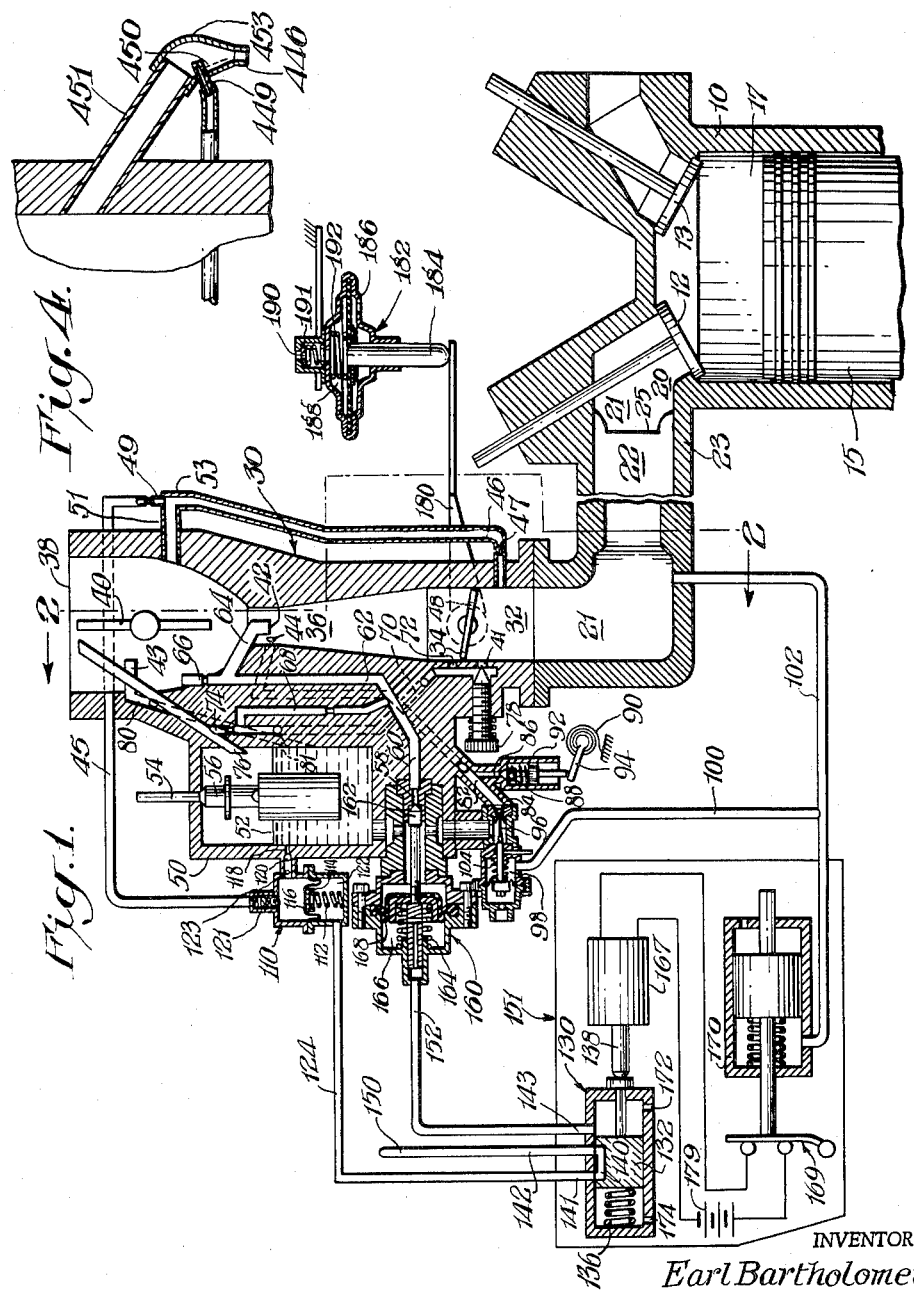
INVENTOR
*Earl Bartholomew*
BY *Donald L. Johnson*
ATTORNEY Aug. 3, 1965   E. BARTHOLOMEW   3,198,187
INDUCTION SYSTEMS
Filed Oct. 8, 1963   3 Sheets-Sheet 2
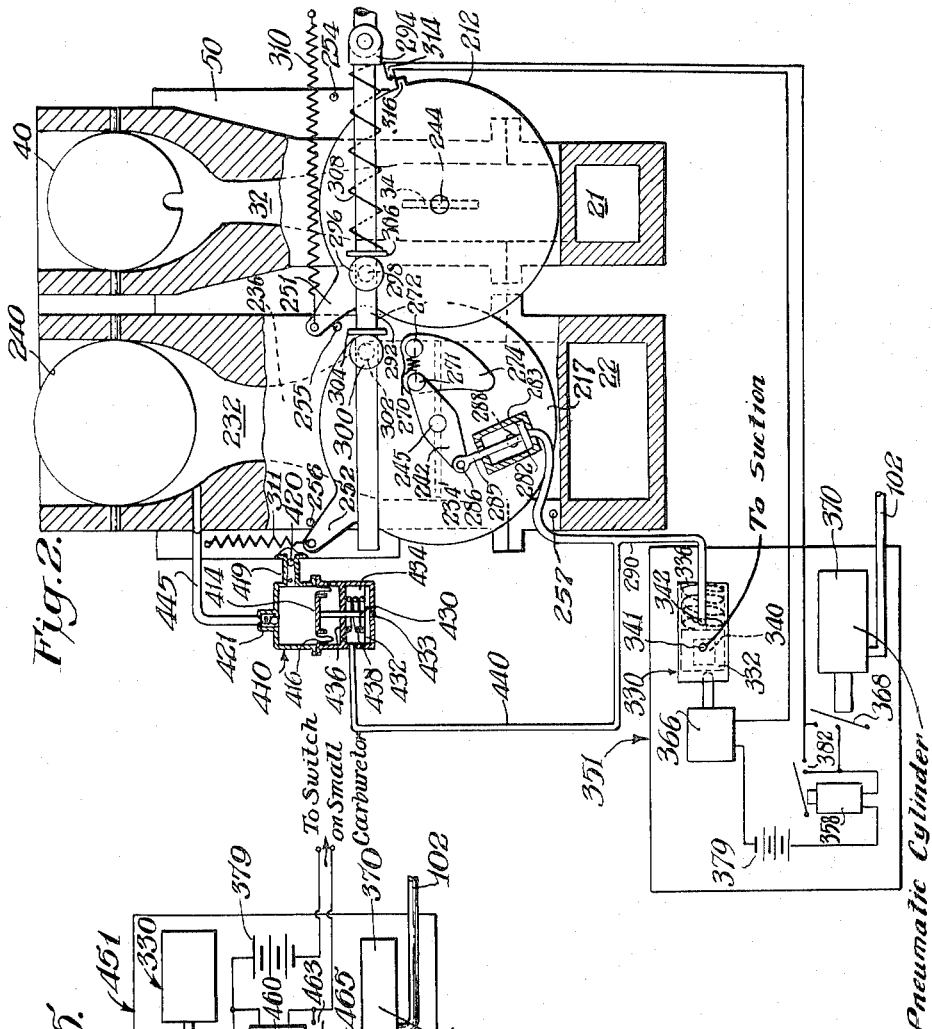
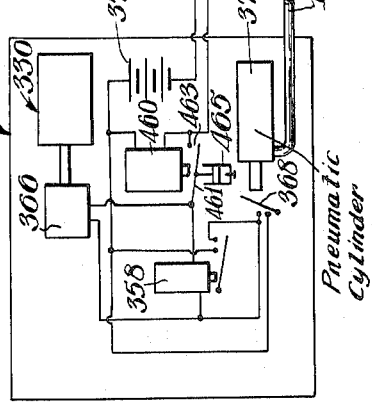
INVENTOR
*Earl Bartholomew*
BY *Donald L. Johnson*
ATTORNEY

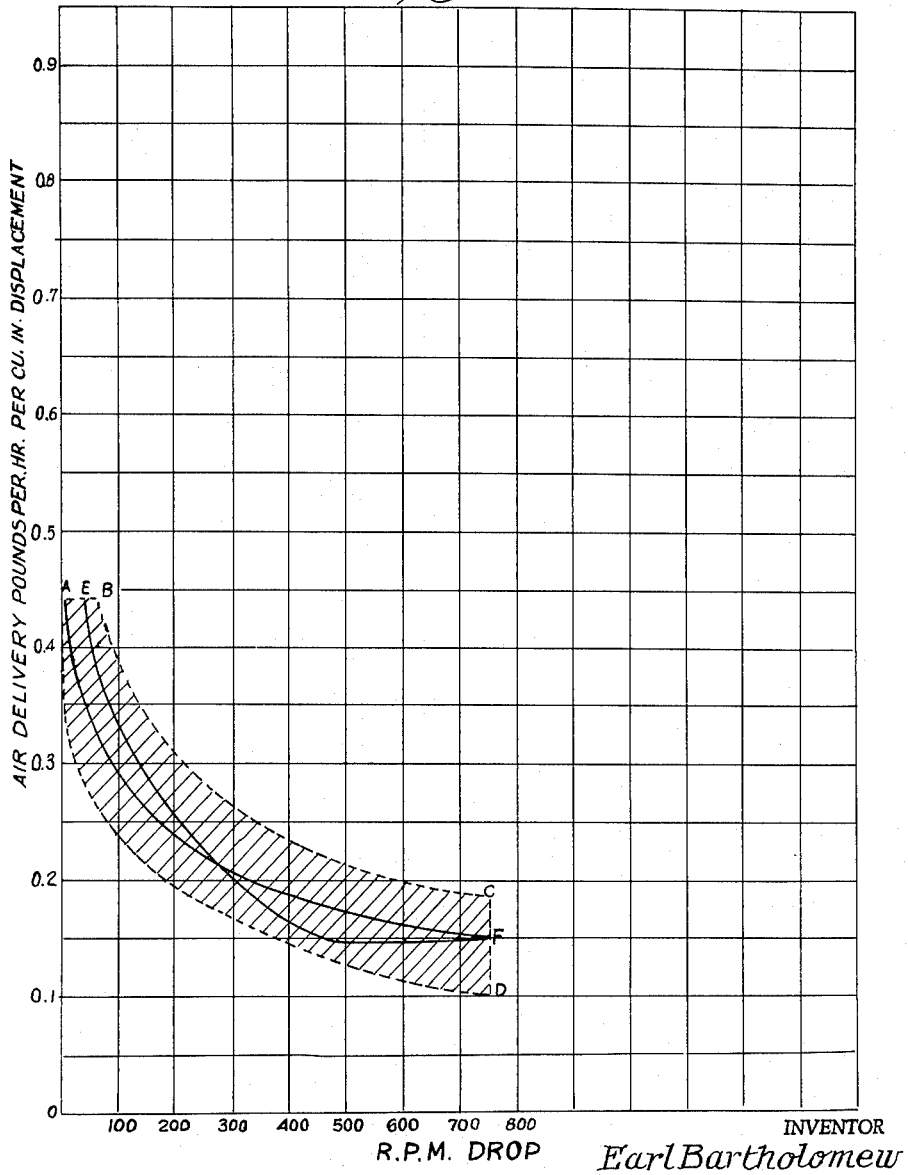

United States Patent Office 3,198,187
Patented Aug. 3, 1965

3,198,187
INDUCTION SYSTEMS
Earl Bartholomew, Birmingham, Mich., assignor to Ethyl Corporation, New York, N.Y., a corporation of Virginia
Filed Oct. 8, 1963, Ser. No. 314,814
17 Claims. (Cl. 123—127)

This application is in part a continuation of prior application Serial No. 301,249 filed August 12, 1963, but since replaced by application Serial No. 445,856 filed March 29, 1965.

The present invention relates to spark ignition internal combustion engines such as those that use gasoline as fuel.

Among the objects of the present invention is the provision of novel engine induction systems and engine operating techniques that are efficient, practical and highly desirable.

The above as well as still further objects of the present invention will be more fully understood from the following description of several of its exemplifications, reference being made to the accompanying drawings wherein:

FIG. 1 is a vertical sectional view, partly diagrammatic, of a portion of a gasoline engine representative of the present invention;

FIG. 2 is a vertical sectional view taken approximately along the line 2—2 of FIG. 1 showing additional details of the engine;

FIG. 3 is a curve diagram illustrating some aspects of the operation of the engine of FIGS. 1 and 2;

FIG. 4 is a detail sectional view of a modified engine construction according to the present invention; and FIG. 5 is a circuit diagram of a portion of a control circuit showing a modification of the corresponding circuit of FIG. 2.

Prior application Serial No. 301,249 describes several modifications of engine induction system constructions. The present application develops additional advantages of some of those constructions and adds further modifications.

According to the present invention a gasoline engine has gasoline supply means for delivering gasoline to at least one cylinder, air supply means including a throttle control for delivering air along with the gasoline to provide an explosive mixture, both of said means being connected to essentially shut off the delivery of gasoline as the throttle control is abruptly closed if at that time the engine is running at more than 1450 r.p.m., intake manifold structure connecting each engine cylinder to both the gasoline supply means and the air supply means, said intake manifold structure providing a manifold of relatively small cross-sectional area and a manifold of relatively large cross-sectional area, and both the gasoline supply means and the air supply means are connected to deliver gasoline and air only through the smaller manifold when such delivery does not significantly limit the power output.

The larger manifold can include the smaller manifold, and can be used to deliver gasoline and air, when at engine speeds above 1400 r.p.m. the engine is called upon to deliver more power than it can with the smaller manifold.

According to another aspect of the present invention, a gasoline engine has gasoline supply means for delivering gasoline to at least one cylinder, air supply means including a throttle control for delivering air along with the gasoline to provide an explosive mixture, both of said means being connected to essentially shut off the delivery of gasoline as the throttle control is abruptly closed if at that time the engine is running at more than 1450 r.p.m., the gasoline supply means being also connected to supply to the engine about 0.15 milliliter of additional gasoline per hundred cubic inches of engine displacement when the shut-off is terminated.

The additional gasoline is very desirably delivered to a portion of the air supply means through which idle air moves at relatively high velocity in order to rapidly carry this fuel to the cylinders. A particularly effective technique is to project this fuel as a liquid jet directly into the idle air stream where its cross-sectional area is not more than about two times its effective cross-sectional area at the idle air flow restriction, but with the jet projected from a nozzle located where the idle air stream moves at a relatively low velocity, for example where its cross-sectional area is at least four times that at the idle air flow restriction.

The above features combine with each other or with the additional features of prior application Serial No. 301,249 or both to make highly desirable and very efficient engines.

FIGS. 1 and 2 illustrate an engine induction system somewhat different from those of the prior application, although but for a few legends FIG. 1 is identical to the correspondingly numbered figure in the prior application. The engine diagrammatically shown is of the four-stroke or so-called "four-cycle" type suitable for use in propelling automobiles, and having a number of cylinders one of which is shown at 10. Cylinder 10 has the usual intake and exhaust valves 12, 13 respectively for admitting fresh gasoline-air mixture into, and exhausting burnt mixtures from, the cylinder. A piston 15 is arranged to reciprocate within the cylinder and defines a combustion zone or chamber 17 which is fitted with a spark plug (not shown) for igniting the incoming mixture after it is compressed by the piston.

The fresh gasoline-air mixture is admitted by intake valve 12 from an intake port 20 which communicates through an intake manifold assembly 23 with a carburetor 30 that mixes gasoline with air and delivers the mixture to the manifold assembly for distribution to the intake ports of the various cylinders. The manifold assembly 23 has two parallel manifolds 21 and 22 separated by a wall 25 and both extending to each intake port where they both open to the port and to each other.

In FIG. 1 the carburetor 30 is illustrated in such a way as to only show its coaction with manifold 21. Its relationship with manifold 22 is illustrated in FIG. 2. Manifold 21 communicates with a carburetor throat 32 having a butterfly type throttle valve 34, a venturi 36, an air horn 38 that can be fitted with a choke valve 40, and a number of fuel supply passages 41, 42, 43, 44 and 45. An extra by-pass 46 is also shown as establishing communication between the portions of throat 32 upstream and downstream of the throttle valve, and the throttle valve itself has a by-pass passageway 48.

All fuel reaches the throat 32 from a fuel bowl 50 where a body of fuel 52 is received from a fuel line 54 under the control of a float valve 56 so that the level of the fuel in the bowl is maintained substantially constant. The principal delivery of fuel from the bowl to the carburetor throat is through a main jet orifice 58 normally in open communication with the lower portion of the fuel in bowl 50, and leading to the venturi in the throat through passageways 60, 62 and 64. An air bleed 66 can also be provided at the high point in this chain of passageways.

For idling of the engine an auxiliary passageway 68 branches from passageway 60, communicates with idling passageway 70 that terminates in idle port 41, and can have a transfer port 72 a short distance upstream of the idle port. An air bleed 74 communicates between the highest point of the idle passageways and the external air as by opening into a bowl vent tube 76 that runs from the upper portion of the bowl to near the top of the air horn 38. An adjustment screw 78 can be used for controlling the flow of idling mixture through port 41.

With a carburetor of the above illustrated type, it is desirable to have an auxiliary flow of additional fuel into the throat when the throttle is open sufficiently far to stop the drawing of fuel through the idle passageways. For this purpose FIG. 1 shows a supplementary fuel passageway 80 leading from the body of fuel in the bowl to port 43 and having a jet orifice 81. This passageway is of sufficient height to keep fuel from being sucked through it until the velocity of the air in the air horn is sufficiently large.

Passageway 80 is shown as not having an air bleed, but such an air bleed can be provided if desired. Similarly the air bleeds 66 and/or 74 can be omitted. The air bleeds also serve as anti-siphoning devices where the discharge level of the fuel passageways is below the level of the fuel in bowl 50.

The supply of fuel through the main jet, the idling jet and the auxiliary jet is in such amount as to provide economical air-to-fuel ratios generally ranging between about 14.0 and 14.8 pounds of air per pound of fuel, and this is adequate for most purposes. However, when maximum or near-maximum power is required from the engine, as during acceleration or hill climbing, it is preferred to have an air-to-fuel ratio between about 12.8 and 14.0 pounds of air per pound of fuel, and for this purpose FIG. 1 shows a power fuel supply including a power fuel passageway 82 opening into the carburetor throat at port 44 and connecting with the fuel in the bowl through a power jet orifice 84.

A feature of the present invention is an air bleed 86 opening into passageway 82 and controlled by a plug 88 that is moved into and away from a position closing the air bleed, by means of a temperature-responsive spring 90. A retracting spring 92 urges the plug away from the air bleed closing position and against an arm 94 which is rotated by spring 90 in response to temperature changes.

A tapered needle valve 96 moved against the resistance of spring 104 by manifold vacuum in chamber 98 varies the area of power jet orifice 84 and thus modulates the flow of fuel in accordance with the level of manifold vacuum. When manifold vacuum is above a preset level, e.g. 10 inches of mercury, the needle valve 96 completely closes orifice 84 and prevents power fuel from flowing. As the power requirement increases and manifold vacuum falls below the preset level, spring 104 gradually retracts needle valve 96 until, at full throttle, needle valve 96 is fully retracted and the maximum amount of power fuel flows.

The temperature-responsive spring 90 and retracting spring 92 are arranged so that at very low temperatures, e.g. 0° F., the spring 90 overcomes spring 92 and pushes plug 88 into closing engagement against the open end of air bleed 86. This causes a minimum amount of air to be mixed with the power jet fuel stream so that more fuel is delivered through that stream per unit time. On the other hand, spring 90 is also adjusted so that as the temperature rises from 0° F. to 100° F. for example, that spring becomes weaker and permits retracting spring 92 to gradually retract the plug 88 from the opening of the air vent 86. As this retraction becomes larger more air is bled in with the power jet fuel stream so that less fuel is supplied to the carburetor throat per unit time.

Although the air bleed 86 is illustrated as having its open end directed downwardly, it can be oriented in other directions without changing its basic operation. It is preferably located above fuel level in bowl 50.

Alternatively temperature-responsive spring 90 and retracting spring 92 may be arranged to push plug 88 into closing engagement against the open end of air bleed 66. This causes a minimum amount of air to be mixed with the main jet fuel stream so that more fuel is delivered through that stream per unit of time when spring 90 is subjected to lower temperature. In this case the mixture enrichment at low temperature is obtained over a wider range of engine operating conditions and can be made larger than that which occurs when the area of air bleed 86 is varied.

The additional fuel supply passage 45 is connected to a pump 110 which is in turn connected to the fuel bowl and arranged to pump out as a single shot a small amount of fuel every time the pump is actuated. Such actuation is provided by an internal spring 112 operating on a piston 114 that pushes a diaphragm 116. Communication with the fuel bowl is through passageway 118, and a ball check 120 permits fuel to flow from the bowl into the pump but prevents flow in the reverse direction. Another check valve 121 permits fuel to be pumped out through passage 45, but keeps the pump's contents from being sucked through that passage when the pump is not operated.

The fuel passage 45 communicates with throat 32 through extra by-pass 46 and orifice 49. The orifice 49 is of such size as to spread the delivery of additional fuel over a period of ½ to 2 seconds, 1 second being preferred.

Injection of the supplementary fuel over the stated period of time by throttling at orifice 49 is particularly desirable for avoiding jerky operation that results from rapid introduction of the fuel as a slug. When the fuel is delivered as a slug, it quickly passes through the engines and momentarily enriches the mixture which otherwise is too lean for combustion. Engine firing which does not occur during most of the deceleration, is resumed with such enrichment but quickly stops as the effect of the fuel slug is dissipated inasmuch as the film of liquid on the manifold walls is generally not restored by the slug. The restoration of the film takes place shortly afterward, and engine firing is resumed again.

The successive resumptions and cessations of engine firing cause torque reversals and when all these reversals occur one after the other within one second or less, the operation of an automobile by the engine becomes annoying to the driver and passengers.

When the supplementary fuel is injected over the longer indicated period of time as by throttling at orifice 49, a combustible mixture is maintained from the moment the throttle is opened during deceleration or fuel flow is restored by the deceleration pump while the throttle is still closed. As a consequence the successive torque reversals are minimized or entirely avoided and car operation is smooth.

Alternatively the supplementary fuel from pump 110 may be injected directly into the carburetor throat after passing through orific 49. With such operation a larger volume of supplemental fuel may be required if the fuel is delayed in reaching the intake manifold.

Discharging the supplementary fuel directly into the idle air stream at a point where the idle air velocity is relatively high, is very desirable. With such a discharge the fuel is rapidly carried to the cylinders so that there is very little lag in the resumption of engine firing. However, high air velocities at the discharge point have a tendency to produce so much suction as to keep lift type valves such as valves 120, 121 of the discharging pump 110, from closing the proper time. This can cause excessive supplementary fuel discharge and in this way greatly increase the level of undesired emissions (CO and partially burnt or unburnt fuel) in the exhaust of the engine.

For the above reason the supplemental discharge is shown in FIG. 1 as leading into a widened portion 51 of the idle by-pass tube 46. In addition the discharge location is just upstream of a point where the by-pass tube narrows down, as indicated at 53, to give the idle air stream flowing through it a fairly high velocity. In this way the shutting of the discharge valves 120, 121 is made quite positive, yet the discharged fuel is promptly delivered to the rapidly moving idle air stream and rapidly transported to the intake ports. Because of the throttling at orifice 49, the supplemental fuel discharges as a jet of liquid which lands directly inside the narrowed portion of tube 46.

The discharge location where line 45 opens into the idle by-pass should for this purpose be at a point where the idle air passageway has a cross-sectional area at least eight times and preferably about fifteen times that at the restriction which determines the idle air flow, as at 47. In addition to the tube 46 from the necking down point 53 to the restriction 47 is a relatively high velocity section inasmuch as its cross-sectional area can be only about three times that of the restriction.

The pump 110 is reset by suction applied to a chamber 122 below the diaphragm through a conduit 124 connected to a slide valve 130. The slide valve is in the form of a tube having three openings 141, 142, 143 in the side wall. A slide 143 is slidable in the tube under the influence of a compression spring 136 and a solenoid plunger 138, and the slide has a cutout 140 sufficient to span across two adjacent openings of the set of three openings 141, 142, 143. Opening 142 is connected to a source of suction by means of a conduit 150. A convenient source of suction for this purpose can be a vacuum booster of the type normally used to operated vacuum-driven windshield wipers when the manifold vacuum is too low. Such a booster can be operated at some convenient suction level such as 13 inches of mercury. A suction reservoir, as in the standard power braking systems, can also be used with or without a booster.

Opening 143 in the slide valve is connected by conduit 152 to a fuel shut-off indicated generally at 160. This fuel shutoff is shown as having a needle valve 162 coacting with the main jet orifice 58 for the purpose of closing the orifice and thereby interrupting the flow of fuel through the main jet. The needle valve 162 is urged towards shut-off position by a spring 164, and a pneumatic chamber 166 including a diaphragm 168 is connected to conduit 152 so that suction applied to that conduit causes the diaphragm to pull needle valve 162 away from the jet-closing position.

Solenoid plunger 138 is under the control of a winding 167 which in turn is actuated by a battery such as the conventional automobile battery 179 and a normally open switch 169. In the illustration, switch 169 has been closed by a pneumatic cylinder 170 operated through suction tube 102. Closing of switch 169 causes the solenoid plunger 138 to be pushed into the illustrated position, moving slide 132 against spring 136, as shown. An increase in pressure in the manifold assembly 23 causes the pneumatic cylinder 170 to release switch 169 so that the switch opens, deactivating the solenoid so that its plunger 138 is retracted and slide 132 is moved to the right by its return spring 136. When so moved, slide 132 has its cutout positioned so as to establish communication between conduit 150 and conduit 152.

The entire control panel 151 has its parts adjusted so that during normal operation of the engine at any position of throttle 34 to develop power, the suction in the manifold assembly 23 is not sufficiently high to cause switch 169 to be closed. The suction line 150 is then connected through slide 132 to fuel shut-off 160, and acts to retract the shut-off needle valve 162 from the main jet orifice 58 so that fuel is available to the manifold assembly. However, when the engine is operated at above 1450 r.p.m and throttle 34 rapidly closed, as in deceleration of an automobile driven by the engine, the suction of the manifolds will increase to a level sufficiently high, generally about 24 inches of mercury, to cause switch 169 to be closed and the slide 132 to be moved to the illustrated position. Conduit 152 is thereby opened to the surrounding atmosphere as by way of vent 172, so that shut-off needle valve 162 is moved into fuel shut-off position by its actuating spring 164. At the same time the suction reservoir is connected through slide 132 and conduit 124 to pump 110, causing the pump's diaphragm to be pulled down to draw in fuel from the carburetor bowl, and thus prepare for a delivery stroke. When the deceleration is terminated, the suction in the intake manifolds drops off, causing switch 169 to be reopened and slide 132 returned to its right-hand position. This opens conduit 124 to vent 174, permitting the spring 112 in pump 110 to push its diaphragm 116 through a pressure stroke and squirt a small amount of fuel in to the air intake system.

Penumatic cylinder 170 and its associated switch 169 should have hysteresis in their operation. In other words, the vacuum that causes the piston to be sucked over to the left-hand position as shown in FIG. 1, will be higher than the vacuum that permits the piston to be moved back to the right-hand position under the influence of its return spring. Switch 169 will also have some hysteresis. The above hysteresis is desirable since it assures that the supply of supplementary fuel by pump 110 takes place at a manifold pressure higher than that at which fuel cut-off is initiated.

A preferred hysteresis, or difference in manifold pressure between the cutoff of fuel and the injection of supplementary fuel is about 2 inches of mercury although anywhere from 1 to 4 inches will be suitable. In the arrangement illustrated in FIG. 1, most of the hysteresis is supplied by the switch, however, the major portion may be obtained from either the vacuum cylinder or the switch.

The hysteresis can be readily adjusted by varying the frictional drag between the piston and cylinder walls of pneumatic cylinder 170. A similar adjustment can be made in switch 169. Optionally the amount of the hysteresis may be increased by having the piston or switch force a viscous fluid through a throttled passage. A third alternative is to use in lieu of the illustrated piston, a flexible diaphragm whose internal friction in flexing furnishes the needed hysteresis.

It should be noted that when the engine is decelerated with the throttle closing delay in operation, the resulting manifold vacuum is further increased to a maximum as the throttle closing delay permits the throttle to move toward the closed position. Vacuum then falls as engine speed decreases.

Pneumatic cylinder 170 and switch 169 are connected so that they operate and cause fuel cutoff in response to a level of vacuum higher than the maximum obtained when deceleration starts at about 1400 r.p.m. The fuel cutoff is then maintained until the manifold vacuum drops to a level slightly below the maximum developed when deceleration begins at 1400 r.p.m. but above that developed during normal idle. This level of vacuum is generally reached just before the deceleration is completed so that the supplemental fuel will then perform its job of making sure the engine begins to fire again.

Throttle valve 34 is shown as completely closed against the walls of the carburetor throat so that no air is permitted to pass between the margins of the throttle valve and the carburetor throat when the throttle is closed. This is helpful in minimizing air flow variations otherwise occurring if the throttle valve is arranged in the usual way so that it does not seal against the throat. The long crescent-shaped gap thus left between the throttle and the throat in such usual constructions is particularly susceptible to significant variation by the accumulation of deposits as well as wear in externally provided throttle stop mechanisms.

The seating of the throttle valve against the throat accordingly requires neither adjustment or adjustment mechanism, and also enables accurate control of idle air as well as supplemental fuel through a by-pass arrangement such as tube 46. If desired, however, some or all of the idle air can be arranged to flow right through the throttle valve as by means of a perforation 48, preferably round so as to show minimum response to the accumulation of deposits. Where all idle air is arranged to be supplied through one or more of such perforations, or even between the edge of the throttle valve and the throat, the supplemental fuel discharge of pump 110 can take place directly above such perforations or edge.

Throttle valve 34 is also arranged so that it cannot be abruptly moved into its fully closed position. For this purpose a stop arm 180 is secured to the throttle valve 34 cooperate with a dash-pot 182 having a plunger 184 positioned for engagement by the stop arm as it approaches the fully closed position. The plunger 184 is secured to a diaphragm 186 that defines an air cushion zone 188 vented by a small opening 190. A spring 192 inside the dash-pot urges the plunger outwardly to engage the stop arm, but is not strong enough to overcome the throttle-closing forces. The throttle will then move to its fully closed position only as fast as the air in cushion 188 is permitted to vent through opening 190. A few seconds is thus required for the last few degrees of throttle closure. The return of the plunger 184 by its spring 192 when the throttle is opened, can be made much more rapid and is preferably completed in about a second or less so as to be prepared for another deceleration when it will introduce another appropriate delay. This helps assure a minimum of undesired emission products.

FIG. 1 shows opening 190 to be incorporated in a check valve disc 191 biased as by a spring against a stop that restricts outflow of air to that opening, but permits inflow of air around the disc. This will provide the more rapid return of plunger 184.

Without the throttle closing delay the movement of air through the carburetor throat would drop very abruptly when the throttle control mechanism is abruptly brought to the closed position. With the delay, however, the air delivery tapers off somewhat. FIG. 3 is a generalized graphical illustration of what happens, the air delivery rate being represented by the ordinate scale, the abscissa scale representing the drop of engine r.p.m. from that at which the throttle control mechanism is abruptly brought to the closed position. The hatched area bounded by the straight line AB, the curved line BC, the straight line CD and the curved line DA, represents a desirable range for the relationship between the r.p.m. drop and the air delivery rate. For example where the air delivery rate at engine idle is about 0.15 pound per hour per cubic inch displacement, abrupt closure of the throttle control mechanism, as by abrupt lifting of the foot from a throttle pedal, when the engine is operating at 1400 r.p.m. with the air delivery rate of 0.44 pound per hour per cubic inch displacement, the throttle delay will preferably cause the air delivery rate to trace the full line curve AF in FIG. 3. This would correspond to a usual form of deceleration from about 30 to about 15 miles an hour of an automobile having such engine coupled with a manual transmission When the engine deceleration is such as accompanies an automobile deceleration of from 50 to 20 miles an hour, the air delivery rate preferably traces the curve shown by the full line EF. The particular manner by which the air delivery rate reaches point E from the running rate which may be as high as 0.8 of a pound per hour per cubic inch displacement, is not significant. However, with the above throttle-closing delay the travel from the running air delivery rate to point E will be substantially a straight line.

FIG. 2 shows more of the carburetion structure. In this figure carburetor throat 32 is illustrated as one of two carburetor throats operated in parallel. The second carburetor throat is shown at 232 and has a diameter that can be up to about 1½ times that of throat 32. Also as shown in FIG. 2, manifold 21 is connected to throat 32 while manifold 22 is connected to throat 232. Fuel is supplied to throat 232 through a separate metered orifice (not shown) and throat 232 is also provided with a venturi 236, a throttle valve 234, and can have a choke valve 240. No provision for idle air flow is allowed in throat 232, and throttle 234 accordingly closes directly against the walls of the throat. Also there is no idle fuel discharge into throat 232. Because throat 232 is only used over a very small range of engine operating conditions, a single fuel supply is all it needs to provide the proper air-to-fuel mixtures. Both throats can accordingly be very easily combined with a single bowl 50, as illustrated in FIG. 2.

For ease of illustration, throttle 34 is shown as viewed from the same relative location in FIGS. 1 and 2, although in the respective figures they should be at right angles to each other.

The two carburetor throttle valves 34 and 234 are controlled by a throttle interlinkage somewhat similar to that described in prior application Serial No. 301,249 filed August 12, 1963.

The interlinkage includes a crank arm 242 fixed onto a shift 245 which carries throttle valve 234, so that the crank arm turns with this throttle valve. Fixed to shaft 244 that carries throttle valve 34 is a disc 212 having an ear 251 that together with fixed stops limit the disc's rotation. A low stop 254 defines the limit of travel of disc 212 in the throttle closing direction, and a high stop 255 limits its movement in the throttle opening direction. A second disc 217 is fitted over throttle shaft 245, but pivots around it instead of being fixed to it. Similar low and high stops 256, 257 cooperate with an ear 252 to limit the travel of disc 217.

Crank arm 242 is restrained against moving with disc 217 by a tension spring 270 that engages the arm at 271 and a pin 272 fixed to the carburetor body. A cutout 274 in disc 217 allows for the positioning of spring 270 and pin 272. An actuator shown as a suction cylinder 282 is arranged to positively connect the disc 217 to crank arm 242 and to overcome the tension of spring 270. Cylinder 282 has a piston rod 283 that is pivoted to crank arm 242 at 286, while the cylinder itself is pivoted to disc 217 at 288. A flexible suction line 290 connects the interior of the suction cylinder to a control panel 351.

Manipulation of the throttles is effected by a rod 292 one end of which 294 is connected to the throttle control such as the accelerator pedal of an automobile in which the engine is mounted. The rod 292 passes loosely through a boss 296 which in turn has a projecting stud 298 that is pivotally received in disc 212. Rod 292 also passes loosely through another boss 300 similarly pivoted as by stud 302 to disc 217.

A flange 304 is fixed to rod 292 for engaging boss 300. Engagement with boss 296 is provided by a washer 306 loosely mounted on rod 292 and urged toward boss 296 by a compression spring 308 backed against a suitable enlargement such as end 294. Both discs are biased toward their low stops by tension springs 310, 311 respectively. A normally open electrical switch 314 is also positioned for closing by a pin 316 carried by disc 212 when that disc is turned against its high stop. This switch 314 is part of the throttle control generally indicated at 351 and is connected in series with a winding of solenoid 366, the contacts of a normally open switch 368, and the winding of a holding relay 358. A battery 379 which can be the same as battery 179 will accordingly energize solenoid 366 when both switches 314 and 368 are closed. Holding relay 358 has contacts 382 which are in parallel with the contacts of switch 368 so that once the solenoid 366 is energized it will remain energized even if switch 368 is subsequently opened, so long as switch 314 remain closed. Switch 368 is actuated by a pneumatic cylinder 370 which in turn can have a suction connection to line 102 as illustrated. Solenoid 366 actuates a slide valve 330 having a slide 332 biased towards the illustrated position by a compression spring 336. One wall of the slide valve has a pair of openings 341, 342, and the slide 332 has a cutout 340 which is large enough to span across these openings. Opening 341 is connected to a source of suction as by means of the line 150 described in connection with FIG.

1. Opening 342 is connected to flexible suction line 290 for suction cylinder 282.

Considering the engine operation in detail, idling and general low power operations are carried out with various positions of throttle 34, but with throttle 234 closed. Because of the very rapid flow of induction mixture through the manifold of smaller cross-section under these conditions, the fuel is very thoroughly mixed with the air and very evenly distributed to the individual cylinders. Relatively high boiling ingredients in the fuel such as tetraethyllead, and very low boiling ingredients such as pentane, are conducted to the individual cylinders in substantially identical proportions to each cylinder. For these results the small carburetor should have a cross-sectional area at the throttle from about 1/4 to about 5/8 square inch per hundred cubic inches of displacement. A preferred figure is about 3/8 square inch for every 100 cubic inches of displacement.

When the engine is called upon to deliver more power than it can readily provide through the manifold of smaller cross-section, as for example when the throttle controls are open further than the position required to hold the small throttle open and the manifold vacuum is greater than about 2 inches of mercury, the throttle 234 of the larger carburetor throat is opened by cylinder 282 and the larger manifold thereby automatically opened to use. Under the influence of the above-described shift-over mechanism, cylinder 370 closes switch 368 and this combined with the closing of switch 314 causes solenoid 366 to be energized, moving slide 332 towards the right, as seen in FIG. 2. Suction is accordingly applied to suction cylinder 282, causing it to open throttle 234 to a degree determined by the position of the throttle control. The engine will now continue to operate with both manifolds carrying the fuel-air mixture to the intake ports. This will continue through throttle movements that open the large throttle more or less so long as the throttle control is sufficiently open to hold the small throttle control disc 212 against its high limit.

When disc 212 is pulled away from its high limit by further closing movement of the throttle control, switch 314 is opened and the suction chamber of cylinder 282 is vented, thus causing throttle 234 to be closed by its spring 270. Throttle 34 remains open to the degree determined by the position of its disc 212.

Under deceleration conditions, the principal operation is with the manifold of smaller cross-section, and here the combination of the throttle closing delay, and when appropriate the shutting off of fuel, provide exceedingly low emission of carbon monoxide and of unburnt or partially burnt fuel. The preferred fuel shut-off takes place if the deceleration begins at engine speeds greater than about 1450 r.p.m. Moreover, the pumping of a small amount of supplementary fuel when the main fuel flow is restored, combines with the other features to give the desired results. About 0.15 milliliter of supplementary fuel pumped in for each 100 cubic inches of engine displacement is preferred when the pumping is into the idle air passageway.

It is sufficient for the fuel shut-off to merely stop the flow of fuel into the main and idle jets. During deceleration there is substantially no fuel moving through the power jet 84 or through the enrichment jet 81. Similarly, no special precaution need be taken with the large carburetor throat 232 inasmuch as its throttle will be closed during deceleration.

When an engine is first started under very cold temperature conditions, extra rich mixtures are needed to have proper combustion in the engine cylinders because of the incomplete evaporation of the fuel. Due to the thorough and even distribution provided by the induction system of the present invention, this enrichment need be no higher than corresponds to about 11.6 pounds of air for every pound of fuel at 0° F. Indeed, it can be as low as 12 pounds of air for every pound of fuel at that temperature. Such power enrichment is not needed for operation through the manifold of larger cross-section since the mixture supplied by the large carburetor throat can be made rich enough, e.g. between 11 and 11.5 pounds of air per pound of fuel, so that no supplemental enrichment is required.

For maximum economy the fuel mixture supplied to the large carburetor throat can be leaned down for operation at normal temperatures, and extra enrichment provided for very low temperature operation. This type of enrichment can be controlled by a bimetallic spring like spring 90, and one spring of this type can be used to control the enrichment for both carburetor throats.

As the engine, fed through the small induction system, is warmed up with relatively high output from the foregoing cold condition, the power-enriching fuel is mixed with more and more bleed air by opening of plug 88, at all times operating with relatively low undesirable emission.

The induction system of the present invention can have either an automatic choke or a manual choke. Choking can be reduced to a minimum and automatic chokes that only operate for about two minutes with a 0° F. start are adequate.

The present invention permits the primary intake system to be designed specifically for relatively high velocity of flow over the lower range of mixture flow requirements without sacrifice of engine performance when the larger volumes of mixture are required. The secondary fuel intake system with its larger manifold can be tailored so that along with the primary intake system it meets high-volume demands.

An automobile powered with the usual size engine and having an induction system such as that illustrated in FIGS. 1 and 2 with the smaller manifold cross-sectional area 3/8 square inch for every hundred cubic inches of engine displacement, will operate satisfactorily, using only the smaller manifold under all conditions except that combination with respect to the primary system of full throttle and manifold vacuum greater than 2 inches of mercury. For best operation it is ordinarily preferred that manifold vacuum not exceed about 2 inches of mercury at 1500 r.p.m. when the throttle pedal is fully depressed. At manifold vacuums much higher than this value, the vehicle will not be accelerated at the desired rate. Acceleration at full throttle up to about 1500 r.p.m. is usually as rapid as with a standard induction system even though the manifold vacuum produced by the latter is somewhat lower. However, at higher engine speeds when maximum torque is needed, mixture flow takes place through both the primary and secondary system at or prior to the speed where the area of the primary system becomes limiting with respect to the desired level of performance. Thus at all conditions up to about 1500 r.p.m., the fuel-air mixture is delivered to the cylinders solely through the primary intake system regardless of manifold vacuum. At speeds from about 1500 r.p.m. to a previously set upper limit (say about 70 m.p.h.) the primary system is in operation under all conditions except that combination with respect to the primary system of full throttle and manifold vacuum greater than 2 inches of mercury. Under the latter condition and under all conditions above the set speed, the fuel-air mixture is delivered to the cylinders through both intake systems.

The cross-sectional area of each branch of the large manifold at the intake port can be as little as about 1 1/2 square inches for every hundred cubic inches of engine displacement. Larger cross-sections can be used but are not necessary. Operation of this vehicle as described above provides benefits in terms of reduced emissions in the exhaust stream and increased fuel economy with or without the throttle-closing delay, fuel cutoff, deceleration fuel pump and fully closing throttle.

Another feature of the present invention is that because of the relatively rapid flow of induction mixture through the manifolds at all times, there is no need for the usual acceleration pump. Such a pump adds more fuel to the induction mixture each time the throttle control is opened, and this is extremely wasteful of fuel. Moreover, the additional fuel tends to increase the carbon monoxide emission of the engine.

The operation of an automobile as described above meets all driving requirements except that it tends to show a little roughness when the larger manifold is switched to the open position. A very helpful expedient in smoothing over this roughness is the supplying of the momentary amount of an addition fuel to the large carburetor throat 232. In FIG. 2 this supplemental fuel supply is shown in the form of an additional diaphragm pump 410 with an intake 419 opening into the liquid 52 (see FIG. 1) in the carburetor bowl, and a discharge line 445 running into throat 232. A ball check 420 in the intake, and another check 421 in the discharge make sure the liquid is pumped properly and yet not permitted to be sucked into throat 232 when the pump is not operated.

Pump 410 has a diaphragm 416 secured to an impeller 414 held by a rod 430 that also carries a piston 432. A pneumatic cylinder 434 is provided above piston 432 by a fixed partition 436 through an aperture in which piston rod 430 slidably penetrates. A vent 433 is in the cylinder below the piston, and a spring 438 in the cylinder urges the piston downwardly so that the pump is in position for a pumping stroke. A suction line 440 connects the cylinder with suction opening 342 in the control assembly 351.

When the control assembly operates to effect the shiftover from the manifold of smaller cross-section to that of larger cross-section, suction is applied to opening 342, and through line 440 to the pneumatic cylinder 434 of pump 410. This causes the pump piston 432 to be lifted against its spring 438, squirting a single charge of fuel into throat 232. No more fuel flows through pump 410 so long as the larger manifold remains continuously in use. When there is a return to the use of only a smaller manifold, the pump's pneumatic cylinder is vented by slide valve 330, and the piston 432 pushed down by its spring 438. This draws replenishing fuel from the carburetor bowl through intake 419, and the pump is thus prepared for the next pumping stroke.

A single charge of about ½ milliliter of fuel per 100 cubic inches of engine displacement, made at the shiftover from the manifold of smaller cross-section to that of larger cross-section has been found to make it a particularly smooth shift even when the engine is under heavy load, without detracting significantly from the efficiency of the engine and without detectably increasing its emission of unburnt and partially burnt fuel as well as of carbon monoxide. However, as much as 1 milliliter can be used per 100 cubic inches of engine displacement with very good results, and as little as ⅛ milliliter per 100 cubic inches will give detectable improvement, although no extra fuel whatever is needed to make the engine perform adequately.

The engine operation shows no detectable roughness when the large manifold is switched off by closing of the large throttle valve. This is a feature which distinguishes the operation of the present invention from that described in prior application Serial No. 301,249 filed August 12, 1963. The engine of that prior application tends to show roughness when its larger manifold is switched off.

As in the prior application, the opening and closing of the larger manifold of the present invention is arranged to avoid hunting. When the larger manifold is opened, the manifold pressure tends to drop, so that the cylinder 370 may permit switch 368 to open. However, the opening of the manifold is accompanied by closing of lock-in contacts 382 which are in parallel with switch 358, so that the larger manifold remains open and there is no tendency to close it so long as switch 314 is in closed condition. This arrangement also avoids hunting when the larger manifold is closed.

Under some uonditions of engine operation the control assembly 351 may permit the larger manifold to be opened for use even though the extra power supply provided by that manifold is not needed. For example, when the engine is in an automobile that is cruising at medium speeds, the manifold vacuum is relatively high and much more than enough to cause pneumatic cylinder 370 to close switch 368. Simple cruising of this type does not open the larger manifold so long as the smaller throttle is not opened sufficiently far to trip switch 314. However, during such cruising the throttle control can be abruptly opened further in order to provide somewhat more power, still without need for opening the larger manifold. Under such circumstances the relatively high manifold vacuum will drop because of the extra throttle opening but the drop lags somewhat behind the throttle. As a result, the manifold vacuum may still be above the critical limit required to close switch 368 although if the larger manifold remains closed the manifold vacuum would drop below the critical limit, indicating that no opening of the larger manifold is really needed. Nevertheless, even a momentary manifold vacuum above the critical limit will, under the influence of closed switch 314, actuate holding relay 358 into lock-in condition and the larger manifold will be opened and remain open.

FIG. 5 shows a modified control assembly 451 which avoids the above-described unnecessary opening of the larger manifold. Assembly 451 includes all the components of assembly 351, which components are represented by the same reference characters. In addition, assembly 451 has a delay relay 460 with an armature 461 normally biased to keep open contacts 463, but pulled by the actuation of its windings to close these contacts. A dash-pot or similar device is connected to armature 461 to pneumatically slow down the movement of the armature 461 in response to the pulling action of the windings. A delay of a half a second is all that is needed bteween the initial energization of the windings of relay 460 and the closing of contacts 463. This delay is enough to permit the manifold vacuum to fall below the critical limit to which cylinder 370 is set when the extra power of the larger manifold is not desired.

The circuit of FIG. 5 is accordingly arranged so that when the smaller throttle valve reaches its wide-open position to close switch 314, the only thing energized is the delay relay 460. During the delay that follows, the actuating solenoid 366 will not be energized by closure of switch 368. Neither will the holding relay 358 be energized at that time. After the delay is completed and contacts 463 are closed, actuating solenoid 366 will be energized if the manifold vacuum at that time is sufficiently great to cause pneumatic cylinder 370 to close switch 368. The remainder of the operation of FIG. 5 is exactly the same as that of FIG. 2.

The delay used in the circuit of FIG. 5 can be provided by pneumatic means as in pneumatic dash-pot 465 or by hydraulic means as by a hydraulic dash-pot, or by any other means such as electrical. A bimetallic switch arm can, for example, be heated by battery current so that after a suitable delay period it will be hot enough to snap into circuit-closing position.

Delay in the use of the manifold pressure that operates switch 368 can also be provided by slowing down the opening of the throttle control as it nears its wideopen limit. A pneumatic check, for example, can be connected to the throttle control rod 292 and arranged so that the last few degrees of throttle opening cannot be made to take place abruptly. With such an arrangement the manifold vacuum will drop rapidly enough as the throttle is opened wide, to avoid unnecessary use of the larger manifold.

A delaying of the throttle opening in this fashion is not as desirable as the use of a delay of the type described in FIG. 5. Any pneumatic check or other device arranged to slow down the throttle opening movement also inserts resistance to the operation of the throttle control, and the engine operator tends to keep from overcoming this resistance, there by leaving the larger manifold unused on many occasions when it is needed.

The delay type control circuit for the checking of the throttle-opening can also be used to modify the opening of the larger manifold when such manifold opening is accompanied by closing of the smaller manifold as described in prior application Serial No. 301,249.

When an automatic choke is used with the induction systems of the present invention, it can be operated from the same temperature-responsive spring used to control the air bleed to the power enrichment jet. Similarly, the pneumatic cylinders 170 and 370 can be combined into a single cylinder as by providing it with two springs of different stiffness to cause it to compress the less stiff spring first and the more stiff spring next, as the manifold suction increases. The switch that is closed when the first spring is compressed can be yieldably mounted so as not to interfere with the further movement of the cylinder to close the second switch.

Other portions of the illustrated structure can have their functions combined. For example, the pump 110 and its associated parts can be arranged to also operate as a supplementary enrichment device so that the fuel passageway 80 can be eliminated. Passage 45 would then open directly into the air horn or venturi, rather than into the idle air-supply bypass. To permit the desired fuel flow, check valve 121 can be eliminated, or its seating pressure reduced to such a degree that the flow of air through the air horn 38 will develop sufficient suction to suck fuel from the carburetor bowl through the pump 110. Where the check valve 121 is retained and such dual operation is desired, the low seating pressure of this valve can be obtained as by merely using the weight of the valve element itself, and the valve closing spring shown can then be eliminated. Positioning the valve passageway so that it runs vertically with the discharge running up provides the maximum effect of gravity.

The intake valve 120 of pump 110 is also in the path of the fuel flow through the pump. No spring is shown in this valve inasmuch as it is not necessary, particularly if the pump is to have the foregoing dual function. A retaining pin 123 merely keeps the valve element 120 from being pushed into the pump. Also the horizontal orientation of the pump's intake passageway keeps the intake valve from significantly impeding the flow of fuel in the desired direction. The intake valve can alternatively be oriented so that the fuel flow through it is vertically downward, or in any other direction. The vertical downward direction is preferred.

For the dual purpose operation the metering orifice 49 in the discharge line of the deceleration pump can be eliminated or replaced by metering built into either or both of the check valves instead.

A snap action is preferred for the fuel shut-off as well as for the shutting off of the larger manifold, and the above described controls have such snap. Similar snap actions can also be obtained by directly using the electrical circuits of these controls to operate an electric fuel shut-off solenoid and electric throttle switching solenoids. A relatively large manifold-pressure responsive cylinder would be called for to directly open or close the large manifold with a snap, because of the small manifold vacuum involved. A small cylinder can, however, be used to trigger the application of suction from a vacuum reservoir, or trigger direct electrical operation by solenoids.

FIG. 4 illustrates a modified form of injection arrangement for the additional fuel used at the termination of a deceleration. This arrangement has been found particularly desirable in reducing the tendency for lift-type valves controlling the additional fuel to stay open. As illustrated, an idle air by-pass is arranged to have a first section 451 of relatively large cross-section connected by means of elbow 453 to a relatively narrow section 446 that leads through the usual control obstruction to the downstream side of the throttle valve. Section 446 has an internal cross-section three times as large as the control obstruction and section 451 has a cross-section about five times as large as that of section 446.

In to the elbow 453 there penetrates a discharge tube 449 having a small nozzle opening 450 pointed downstream. The opening 450 is of such size that the supplementary fuel, about 0.15 milliliter per 100 cubic inches of engine displacement, takes about one second to discharge through it, and discharges as a liquid jet through it. The nozzle is so positioned that the liquid jet lands directly within section 446.

Section 451 can open at its upstream end into the carburetor horn, or if desired can be directly open to the air independently of the remainder of the carburetor.

The flow of idle air through the small carburetor can also be controlled, as by having all such idle air arranged to be supplied through a by-pass like 46 or 446, with a shut-off valve in the by-pass connected to be automatically closed when no idle air is wanted. The throttle 34 will then have no opening 48 and no other arrangement for idle air to get past it.

Not much is gained by shutting off such idle air movement through small carburetor throat 32 when the engine is operating through the large carburetor throat 232. However, during deceleration it is helpful to shut off all idle air whenever the fuel is shut off. With such simultaneous shut-off of fuel and air, the advantage of a throttle-closing delay is minimized and such delay can be entirely eliminated. Without the throttle-closing delay, the fuel shut-off is preferably made as complete as possible, as by having the shut-off in the idle fuel passageway 68 close to where it opens into throat 32, and preferably in the passageway section between air bleed 74 and transfer port 72. Without a shut-off in this location the fuel always found in this section as the throttle 34 is closing, will be sucked into the manifold assembly even though a shut-off is effected at 60. The idle fuel shut-off can be combined with the shut-off at 60, or can be used by itself without a shut-off at 60. Where no throttle-closing delay is used, the shut-off at 60 is not eevn needed, particularly if all air flow to the engine is shut off by closing of the throttle 34, inasmuch as abrupt decelerations promptly close this throttle and thus prevent fuel delivery through the main jet.

The effect of combining a throttle-closing delay with fuel cut-off at decelerations from speeds of about 1400 r.p.m. or lower, is to increase the emission at the exhaust of unburned and partially burned fuel, as compared with carrying out such decelerations with a throttle-closing-delay alone. At about 1450 r.p.m., decelerations begin to show favorable results with fuel cut-off. When in an automobile decelerating in a downgrade, the fuel cut-off takes place with decelerations that start from 1500 or more r.p.m. if the control is adjusted to provide fuel cut-off at about 1450 r.p.m. during level-road deceleration.

Where the effects of a throttle-closing delay are desired, they can be obtained by providing a by-pass for fuel and air to move from the upstream side of the throttle 34 to the downstream side. The throttle can then be abruptly closed, and a temporary opening of such a by-pass will provide the extra fuel and air otherwise made available by a throttle-closing delay. The manifold that is made so as to have a shiftable cross-section. For example a manifold can be made with readily deformable walls, or a rigid outside wall can have an inflatable internal conduit running lengthwise of it. Shiftover to the smaller cross-section is then accomplished by physically squeezing the deformable walls or inflating the internal conduit.

No changes need be made in the standard ignition systems for the present invention. Any type of ignition can be used, battery or magneto, with spark advance and retard actuated by any desired mechanism.

It is a further feature of the present invention that idle operation can be obtained with air-to-fuel mixtures leaner than heretofore ordinarily considered practical. This is essentially attributable to the use of a relatively small cross-section for the manifold. An idle mixture of 14.0 pounds of air per pound of fuel can thus be used with important advantages in the accompanying low level of undesired exhaust emissions.

In addition the use of the full-closing throttle valve so as to avoid the long crescent-shaped idle air passageways, keeps the idle air flow from being rapidly changed through accumulation of deposits, etc., so that the lean idle will not be as prone to gradual enrichment. This also reduces the frequency of tune-ups that may be required to assure proper operation. Moreover, the idle air passageways of the present invention can be arranged so that they are not adjustable, and this minimizes the possibility of having them set improperly during servicing.

Elimination of the temperature modulation for the power jet air bleed as well as of the enrichment through passageway 80 will not detract significantly from the desirable results obtained by the construction of the present invention. Elimination of deceleration pump 110 will have an effect on deceleration operation, but even without this pump the engine will more than pass standard antismog standards.

The use of a single non-adjustable manifold in place of the dual manifolds will sharply reduce the improvements, but will still provide important advantages apparently not obtainable in any other way.

The above consideration apply particularly to engines used in automobiles equipped with manual, that is all-mechanical transmissions. These are the worst offenders with respect to undesired emissions. When used with automatic transmissions or fluid drive couplings, a very similar low level of emissions is obtained by means of the present invention, although the advantages are not quite as striking because without the present invention the level of emissions is somewhat lower than with all-mechanical transmissions.

With fluid couplings the engine decelerates more rapidly and during deceleration is not driven as much by the automobile's momentum. Moreover gear shifting is accomplished automatically without throttle closure. Accordingly throttle-closing delay is not as beneficial in reducing emission. However, devices which cause throttle-closing delay are generally used with fluid couplings in order to help assure that the engine does not die when the throttle is closed abruptly. The devices are designed and adjusted to accomplish this objective. Because of variation in the tendency of car engines to die after abrupt throttle closure, the duration of the delay and the angle of throttle movement involved cover a considerable range. The throttle-closing check of the present invention preferably produces the variation in air flow during deceleration that is indicated in FIG. 3. This type of delay device also keeps the engine from dying when its throttle is closed abruptly and it is fluid-coupled to a transmission. It should be noted that the throttle-closing delay of the present invention is principally for use when decelerations are begun from 1100 or more r.p.m., and such delay can be arranged not to take place at lower r.p.ms. This modification will also save fuel, provide better engine braking at low speeds, and simplify forward and backward movements such as those involved in parking automobiles in cramped spaces.

To effect the elimination of throttle-closing delay at engine speeds of about 1100 r.p.m. or less, it is convenient to have a pneumatic type snubber as in FIG. 1, with a speed-responsive device connected to vent the pneumatic chamber when the engine speeds are sufficiently low. Prior application Serial No. 301,249 filed August 12, 1963, describes several techniques for accomplishing such elimination of the throttle-closing delay at low speeds.

Obviously many modifications and variations of the present invention are possible in the light of the above teachings. It is therefore to be understood that within the scope of the appended claims the invention may be practiced otherwise than as specifically described. For instance, instead of having the two carburetor throats operate from a single carburetor bowl, two entirely separate carburetors can be provided, each with its own bowl. Alternatively a single large carburetor throat can be used to supply both manifolds, so that the smaller carburetor throat can be eliminated. All fuel can then be supplied to the large throat. As another alternative fuel can be supplied to the engine by injection directly into the manifolds and still take advantage of the desirable features of the present invention.

As still another alternative, the larger carburetor may be brought into operation at any engine speed after the throttle of the smaller carburetor has been fully opened if provision is made for application of an amount of heat to the larger manifold which insures good vaporization of fuel when the larger carburetor is brought into operation without having a deleterous effect on fuel antiknock performance. Heating of the larger manifold may be either by engine coolant or exhaust gas, preferably the latter because of the more rapid warmup that results.

When fuel-air mixture is flowing through an intake manifold, heat is transferred from the manifold walls to the mixture as the fuel is vaporized and the temperature of air and fuel is increased. If mixture velocity is low in the manifold, the walls must be at relatively high temperature when the throttle is opened in order to insure good vaporization of fuel and even distribution of fuel to the cylinders.

If in a conventional engine the amount of heat applied to the intake manifold is sufficient to provide such high temperature of the manifold walls at the time the throttle is opened after operation at idle or during cruising in the low speed range, the amount applied during cruising at the higher speeds becomes excessive, resulting is loss of power, fuel knocking or autoignition. Such excessive heating, by raising mixture temperature to a high level after ignition current has been cut off, may cause after-running of the engine. A heating system which avoids these undesirable features of engine operation provides lower manifold temperature at full throttle at low speed is needed to effect good fuel vaporization and distribution, or during warmup or when atmospheric temperature is low.

The fuel induction system of smaller cross-sectional area described hereinbefore, creates high mixture velocity and results in good fuel vaporization and distribution with less severe manifold heating.

The normal regime of operation of the dual mixture-induction system is such that a heating system for the larger manifold can be constructed which provides adequate heating for good fuel vaporization and distribution when the large carburetor is brought into operation at low engine speed without the aforedescribed overheating under other conditions of engine operation. When the throttle of the larger carburetor is closed, substantially no mixture flows through the larger manifold. As a consequence, application of only a moderate amount of heat to the large manifold raises the temperature of the manifold walls to a level that produces good fuel vaporization and distribution when the larger carburetor is brought into operation at low engine speed.

As mixture continues to flow in the large manifold, the temperature of the walls is reduced because of heat transfer. As engine speed increases, velocity of the mixture in the larger manifold increases and the need for manifold heating decreases. Volumetric efficiency and power are not reduced and tendency toward autoignition and after-running is absent.

What is claimed is:

1. A gasoline engine having gasoline supply means for delivering gasoline to at least one cylinder, air supply means including a throttle control for delivering air along with the gasoline to provide an explosive mixture, both of said means being connected for limiting the reduction of air delivery when the throttle control is abruptly closed so that the relationship between the air delivery rate and the engine r.p.m. drop falls within the area ABCD of FIG. 3, both of said means being further connected to essentially shut off the delivery of gasoline as the throttle control is abruptly closed if at the time the engine is running at more than 1450 r.p.m., the gasoline supply means being also connected to supply to the engine about 0.15 milliliter of additional gasoline per hundred cubic inches of engine displacement when the shut-off is terminated and to supply the additional gasoline into a portion of the air supply means where the air velocity is relatively high at engine idle.

2. The combination of claim 1 in which the gasoline supply means is connected to supply the additional gasoline as a liquid jet into a portion of the air supply means at which its cross-sectional area is not more than about three times the effective idle air flow restriction.

3. The combination of claim 2 in which there is a nozzle for the liquid jet, and this nozzle is located in a portion of the air supply means where the idle air stream has a cross-sectional area of at least eight times that of the idle air flow restriction.

4. A carburetion apparatus having a liquid fuel bowl, a conduit for passage of air into which the fuel is to be introduced, an idler air flow restriction in said conduit, said conduit having a relatively wide portion with a cross-sectional area at least about eight times that of the restriction, fuel control elements connected to (a) control the flow of fuel from the bowl to the air conduit (b) shut off such flow when downstream of the restriction there is an increase in vacuum substantially above idle vacuum, and (c) project an extra amount of fuel as a liquid jet from the relatively wide portion of the conduit into a relatively narrow portion of the conduit when such shut-off is terminated.

5. The combination of claim 4 in which there is no provision for an acceleration pump to supply acceleration fuel to the induction system of said conduit.

6. The combination of claim 4 in which there is also throttle-closing delay mechanism to prevent the throttle from closing abruptly.

7. A gasoline engine induction system having intake manifold structure and a carburetor, and free of an acceleration pump, the carburetor including a liquid fuel bowl, an idle air supply conduit connected to deliver idle air to the manifold, an idle air flow restriction in said conduit, said conduit having a relatively wide portion with a cross-sectional area at least about eight times that of the restriction, and a liquid projecting nozzle in said relatively wide portion pointed to project liqud downstream into a narrow portion of the conduit.

8. The combination of claim 7 in which the intake manifold structure includes an additional manifold connected in parallel with the first mentioned manifold and having a separate induction system.

9. A gasoline engine having gasoline supply means for delivering gasoline to at least one cylinder, air supply means including a throttle control for delivering air along with the gasoline to provide an explosive mixture, both of said means being connected to essentially shut off the delivery of gasoline as the throttle control is abruptly closed if at that time the engine is running at more than 1450 r.p.m., the gasoline supply means being also connected to supply to the engine about 0.15 milliliter of additional gasoline per hundred cubic inches of engine displacement when the shut-off is terminated and to supply the additional gasoline directly into a portion of the air supply means at which idle air is supplied through a cross-sectional area not more than about three times the effective idle air flow restriction.

10. A gasoline engine having an induction system for delivering air and gasoline to at least one cylinder, said system including manifold means connected to provide two selectable manifold cross-sections to carry the air and gasoline, and automatic control elements connected to the manifold means to automatically select the smaller cross-section when the manifold vacuum shows the engine is operated at less than maximum power, and automatically select the larger cross-section when the manifold vacuum shows the engine is operated at power demands to large for the smaller cross-section, the control elements including delay mechanism connected to permit the manifold vacuum to adjust to the engine operation notwithstanding abrupt manipulation of the engine throttle actuator.

11. The combination of claim 10 in which the delay mechanism postpones for about ½ second the response to the manifold vacuum.

12. The combination of claim 1 in which the gasoline supply means and the air supply means includes parallel-connected dual intake manifolds, one or relatively small cross-sectional area, and the other of relatively large cross-sectional area, and both the gasoline supply means and the air supply means are connected to deliver gasoline and air only through the smaller manifold when such delivery does not unduly limit the power output.

13. The combination of claim 1 in which the gasoline supply means and the air supply means are connected to supply a mixture having an air-to-fuel weight ratio of at least about 14.0 to 1 except when the power requirement approaches maximum.

14. The combination of claim 5 in which the control elements are connected to supply a fuel mixture having an air-to-fuel weight ratio of at least about 14.0 to 1 except when the power requirement approaches maximum.

15. The combination of claim 7 and further including supply elements connected to supply a fuel mixture having an air-to-fuel weight ratio of at least about 14.0 to 1 except when the power requirement approaches maximum.

16. The combination of claim 9 in which the gasoline supply means and the air supply means are connected to supply a mixture having an air-to-fuel weight ratio of at least about 14.0 to 1 except when the power requirement approaches maximum.

17. The combination of claim 10 in which the induction system is connected to suply a fuel mixture having an air-to-fuel weight ratio of at least about 14.0 to 1 except when the power requirement approaches maximum.

References Cited by the Examiner

UNITED STATES PATENTS

| | | | |
|---|---|---|---|
| 1,623,750 | 4/27 | Pingree | 123—127 |
| 1,982,049 | 11/34 | Fageol. | |
| 2,386,669 | 10/45 | Ericson | 123—127 |
| 2,877,998 | 3/59 | Cornelius | 123—97 XR |
| 2,879,756 | 3/59 | Cornelius | 123—97 |
| 2,908,363 | 10/59 | Dietrich | 123—97 XR |

RICHARD B. WILKINSON, *Primary Examiner.*

KARL J. ALBRECHT, *Examiner.*